United States Patent
Schwengler

(10) Patent No.: US 6,678,259 B1
(45) Date of Patent: Jan. 13, 2004

(54) SYSTEM AND METHOD FOR LINE OF SIGHT PATH COMMUNICATION

(75) Inventor: Thomas Schwengler, Lakewood, CO (US)

(73) Assignee: Qwest Communications International, Inc., Denver, CO (US)

(*) Notice: Subject to any disclaimer, the term of this patent is extended or adjusted under 35 U.S.C. 154(b) by 0 days.

(21) Appl. No.: 09/320,071

(22) Filed: May 26, 1999

(51) Int. Cl.[7] .............................. H04Q 7/00; H04J 3/16
(52) U.S. Cl. ..................... 370/329; 370/437; 370/216; 455/67.15
(58) Field of Search ................ 370/216, 217, 370/437, 329, 328, 334; 375/347, 426.2; 455/450, 9, 8, 67.15, 13.3, 25, 63.4, 63.15, 562.1, 101, 143, 225, 275, 303, 67.11, 67.16, 508; 343/725, 729, 751, 835, 875, 878

(56) References Cited

U.S. PATENT DOCUMENTS

| | | | |
|---|---|---|---|
| 4,083,009 A | * 4/1978 | Bickford et al. ............ 375/347 |
| 4,704,734 A | * 11/1987 | Menich et al. ............ 455/562 |
| 5,818,832 A | * 10/1998 | McCallister ................ 370/350 |
| 5,822,324 A | * 10/1998 | Kostresti et al. ............ 370/487 |
| 5,884,181 A | * 3/1999 | Arnold et al. ............ 455/450 |
| 6,141,557 A | * 10/2000 | Dipiazza .................. 455/562.1 |

* cited by examiner

Primary Examiner—Min Jung
Assistant Examiner—Andy Lee
(74) Attorney, Agent, or Firm—Brooks Kushman P.C.

(57) ABSTRACT

A system and method for broadband communication between a network and a customer premise along the line of sight path utilizes redundant communication paths. The primary communication path is along a first line of sight, and the primary transmitter is configured to transmit at a sufficiently high frequency to require line of sight communications. The redundant or secondary communication path may be a different line of sight path to the same or a different transmitter, or may be a lower frequency communication path in different embodiments of the present invention.

12 Claims, 3 Drawing Sheets

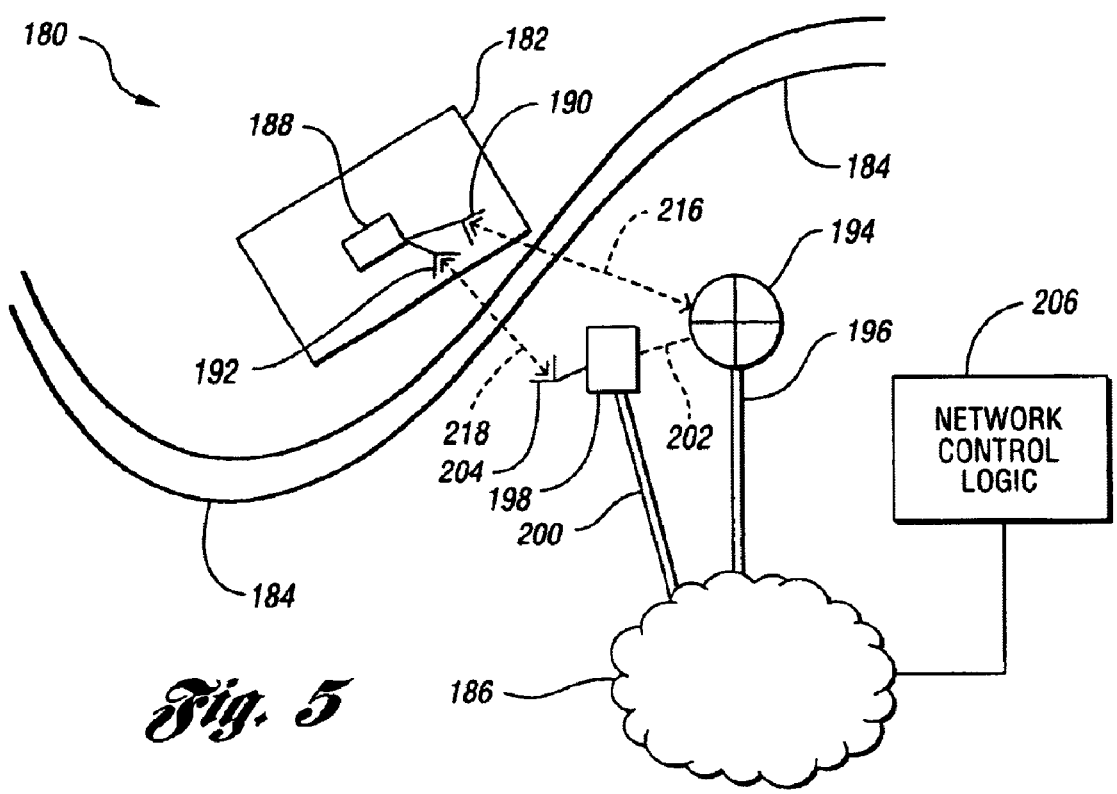
Fig. 5
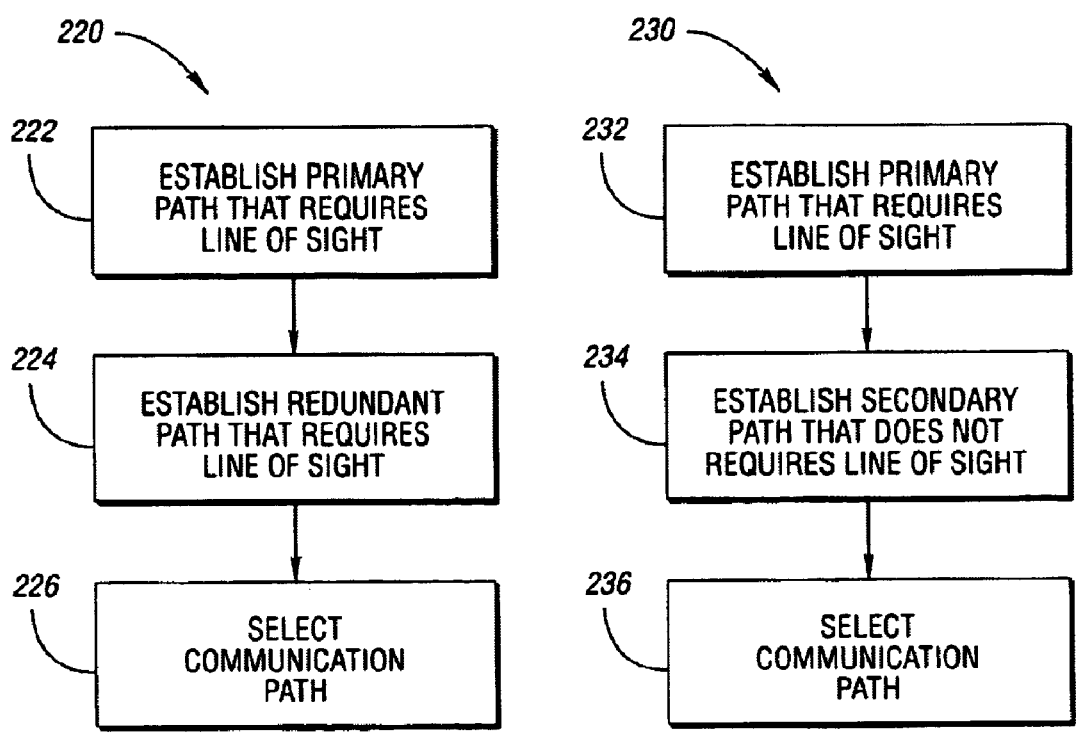
Fig. 6
Fig. 7

SYSTEM AND METHOD FOR LINE OF SIGHT PATH COMMUNICATION

TECHNICAL FIELD

The present invention relates to systems and methods for broadband communication between a network and a customer premise along a line of sight path.

BACKGROUND ART

Local Multipoint Distribution System (LMDS) in an existing architecture involves broadcasting microwave signals at frequencies at or above 28 gigahertz to small receiver dishes, typically installed on the top of apartment buildings. At that high frequency, line of sight is required for maximum signal performance. The received LMDS signal may then be distributed through the building. In general, existing LMDS systems use the LMDS receiver to serve one customer or subscriber, with each different customer or subscriber having a single dedicated LMDS receiver.

Current microwave links, including LMDS links, are designed to compensate for a number of fades. One type of fade is known as a fast fade. A fast fade occurs when a signal reaches a receiver by taking two paths of different lengths. Different path lengths may cause partially destructive or totally destructive interference, resulting in a noisy or faded signal. Because of the highly directional and the fixed nature of LMDS links (and other line of sight links), these links do not exhibit significant fast fades. The fast fades that are experienced cause limited bit and cell errors, which may be readily cleaned up by forward error correction.

Another type of fade is the long term fade. That is, weather may cause a long term fade. For example, rain causes long term fade of high frequency signals. Long term fades are generally addressed through power control and link budget design.

And lastly, another type of fade that is particularly cumbersome in LMDS and other line of sight applications such as microwave links (above about 12 Gigahertz) and infrared links, is the long term obstruction. A long term obstruction is an obstruction that may last as much as a few minutes or longer. In particular, a long term obstruction is something that interrupts the line of sight which is required for LMDS links and other links sufficiently high in frequency to require line of sight.

Although existing deployment of LMDS (and other line of sight technology including microwave links above about 12 Gigahertz and infrared links) has been quite limited, the higher frequencies and additional bandwidth associated therewith is not yet being utilized to its full potential. For the foregoing reasons, there is a need for line of sight communication systems and methods that are capable of compensating for long term obstructions that interfere with the required line of sight during communication.

DISCLOSURE OF INVENTION

It is, therefore, an object of the present invention to provide a system and method for broadband communication between a network and a customer premise along a line of sight path that utilizes a redundant or secondary link to overcome the problems associated with long term obstructions.

In carrying out the above object, a system for broadband communication between a network and a customer premise along a line of sight path is provided. The system comprises a customer premise equipment and at least one transmitter in communication with the network and configured to transmit at a sufficiently high frequency to require line of sight. The customer premise equipment has a first directional antenna operative to communicate in a first line of sight. The customer premise equipment also has a second directional antenna operative to communicate in a second line of sight that is different than the first line of sight. The at least one transmitter, the first antenna, and the second antenna are located so as to form a primary communication path along the first line of sight and to form a redundant communication path along the second line of sight.

In one embodiment, the at least one transmitter further comprises a first transmitter and a second transmitter. The first transmitter is located within the first line of sight and selectively operative to communicate with the first antenna along the primary communication path. The second transmitter is located within the second line of sight and selectively operative to communicate with the second antenna along the redundant communication path. Preferably, the system further comprises network control logic configured to select one of the primary and redundant communication paths based on a status of the first and second lines of sight. That is, the network control logic permits transmission by the first transmitter when the primary path is selected and permits transmission by the second transmitter when the redundant path is selected. Utilizing network control logic to only transmit from the transmitter having a clear line of sight is particularly useful when the first and second antenna are in close proximity to each other to reduce potential for interference in the system.

In another embodiment, the at least one transmitter is a single transmitter within the first line of sight and within the second line of sight. The first and second antennas are sufficiently spaced apart to separate the primary and redundant communication paths. In such an implementation, because the first and second antennas are sufficiently spaced apart to separate the primary and redundant communication paths, it may be preferable to omit the network control logic and allow each transmitter to transmit simultaneously. Accordingly, this embodiment preferably further comprises customer premise control logic configured to select one of the primary and redundant communication paths based on signal quality at the first and second antennas due to a status of the first and second lines of sight. That is, all of the transmitters may transmit and the selection of the appropriate communication path is made at the customer premise.

It is to be appreciated that in embodiments of the present invention, the at least one transmitter may include any number of hubs connected to the network, in addition to including any number of repeaters operative to communicate through a hub to the network. That is, based on local geography, the final connection to the customer premise to establish a communication path may be from the customer premise antenna to a hub or to a repeater (or from a plurality of antennas to a plurality of hubs and/or repeaters).

Preferably, in embodiments of the present invention, the customer premise equipment further includes a decoder configured to decode communications received at the first and second antennas. It is to be appreciated that an antenna may be connect to the customer premise local equipment in a variety of ways. For example, the antenna may be connected to the local equipment by a fiber, a coaxial cable, or a twisted pair. In a suitable implementation utilizing coaxial cable to connect an antenna to the customer premise, the decoder is located at the customer premise and the antenna connects to the coaxial cables through a converter to down convert communications to an intermediate frequency.

In a suitable fiber implementation, the decoder is located at the customer premise local equipment and the converter may be omitted as appropriate. Further, when a twisted pair is used to connect the antenna to the customer premise local equipment, it is preferred that the decoder be located at the antenna to decode the signal prior to transmission along the twisted pair. Of course, it is to be appreciated that an appropriate connector such as twisted pair, fiber, or coaxial cable, may be selected based upon the distance between the antenna and the customer premise local equipment.

Further, embodiments of the invention may be implemented with the sufficiently high frequency in the Local Multipoint Distribution System (LMDS) frequencies. Further, embodiments of the present invention may utilize sufficiently high frequencies with an infrared frequency. Or, other appropriate sufficiently high frequencies may be found at frequencies greater than about 12 Gigahertz.

Further, in carrying out the present invention, a system for broadband communication between a network and a customer premise along a line of sight path is provided. The system comprises a customer premise equipment and at least one transmitter in communication with the network and configured to transmit at a sufficiently high frequency to require line of sight. The customer premise equipment has a plurality of directional antennas operative to communicate in a corresponding plurality of lines of sight. The at least one transmitter and the plurality of antennas are located so as to form a corresponding plurality of redundant communication paths along the plurality of lines of sight.

Still further, in carrying out the present invention, a system for broadband communication between the network and the customer premise along a line of sight path is provided. The system comprises a customer premise equipment, a primary transmitter in communication with the network, a secondary transmitter in communication with the network, and network control logic. The customer premise equipment has a directional antenna operative to communicate in a line of sight. The primary transmitter is configured to selectively transmit at a sufficiently high frequency to require line of sight. The primary transmitter and the antenna are located so as to form a primary communication path along the line of sight. The secondary transmitter is configured to selectively transmit at a frequency sufficient to communicate absent line of sight. The secondary transmitter and the antenna are located so as to form a secondary communication path. The network control logic is configured to select the primary communication path when the line of sight is clear, and to select the secondary communication path when the line of sight is blocked by, for example, a long term obstruction.

It is to be appreciated that this embodiment of the present invention, utilizing a primary and a secondary transmitter, allows a lower frequency non-line of sight link to be used as a backup for a primary communication path that does require line of sight. Further, it is to be appreciated that the customer premise equipment may, if desired, include two antennas, one for communication with the primary transmitter and another for communication with the secondary transmitter, instead of including only a single antenna.

Yet further, in carrying out the present invention, a method for broadband communication between a network and a customer premise along a line of sight path is provided. The method comprises establishing a primary communication path, establishing a redundant communication path, and selecting one of the primary and redundant communication paths.

The primary communication path extends between a first directional antenna and a first transmitter along a first line of sight. The first transmitter is configured to transmit at a sufficiently high frequency to require line of sight. The redundant communication path extends between a second directional antenna and a second transmitter along a second line of sight. The second transmitter is configured to transmit at a sufficiently high frequency to require line of sight. One of the primary and redundant communication paths is selected based on a status of the first and second lines of sight. That is, if one of the lines of sight is interrupted by a large obstruction, the other line of sight is selected for the communication path.

In one suitable implementation, the first and second transmitters are different transmitters. In another suitable implementation, the first and second transmitters are the same transmitter, and the first and second antennas are sufficiently spaced apart to separate the primary and redundant communication paths.

Even further, in carrying out the present invention, a method for broadband communication between a network and a customer premise along a line of sight is provided. The method comprises establishing a primary communication path configured for a sufficiently high frequency to require line of sight, and establishing a secondary communication path for a frequency sufficient to communicate absent line of sight. The method further comprises selecting the primary communication path when the line of sight is clear, and selecting the secondary communication path when the line of sight is blocked by a large obstruction.

The advantages associated with embodiments of the present invention are numerous. For example, systems and methods of the present invention provide architectures for LMDS applications and other sufficiently high frequency applications requiring line of sight communications that overcome the problem of large obstructions associated with systems and methods of the prior art. That is, embodiments of the present invention either employ primary and redundant communication paths at line of sight frequencies, or employ a primary communication path at the high frequency and a secondary communication path at a lower frequency sufficient to communicate absent line of sight, allowing appropriate control logic either at the network or at the customer premise to overcome the problems associated with large obstructions by utilizing the appropriate communication path to avoid the obstruction.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 5 is an alternative embodiment of a broadband communication system of the present invention utilizing a primary transmitter at a sufficiently high frequency to require a line of sight and a secondary transmitter at a frequency sufficient to communicate absent line of sight such that lower frequency communications are used as a backup for when the line of sight is blocked by a large obstruction;

FIG. 6 is a block diagram illustrating a method of the present invention utilizing redundant line of sight communication paths; and FIG. 7 is a block diagram illustrating a method of the present invention utilizing a primary communication path requiring line of sight, and a secondary communication path not requiring line of sight.

BEST MODE FOR CARRYING OUT THE INVENTION

Figure 1:
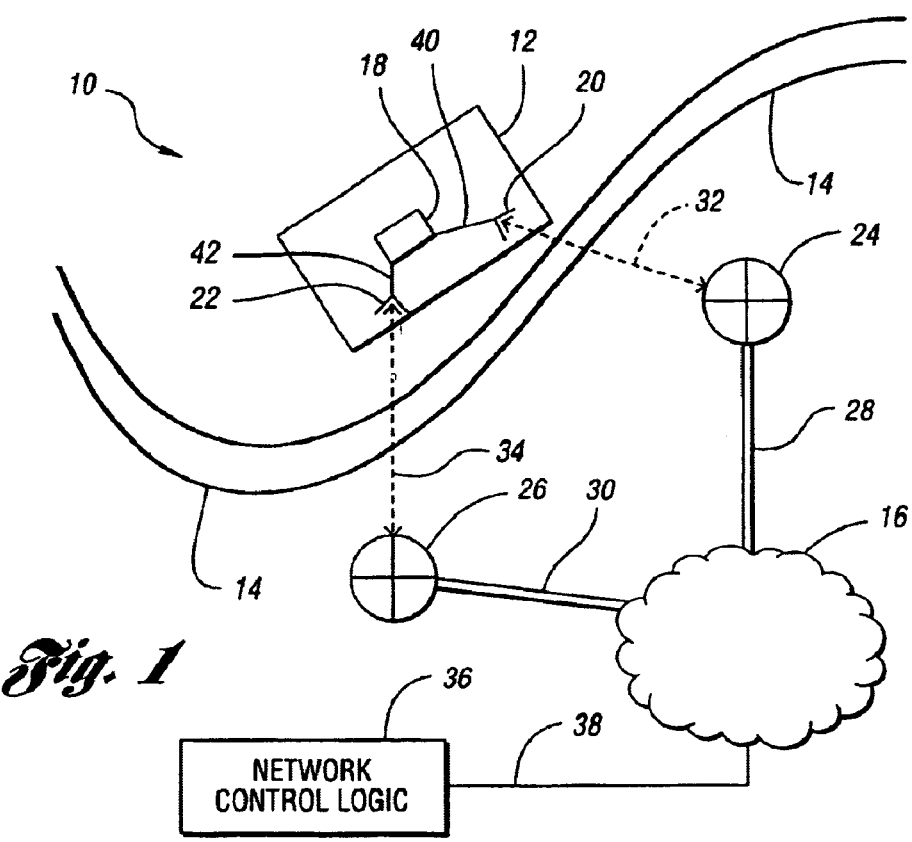
FIG. 1 is a broadband communication system of the present invention utilizing primary and redundant communication paths at a sufficiently high frequency to require line of sight, and network control logic.

With reference to FIG. 1, a first embodiment of the present invention is generally indicated at 10. System 10 advantageously allows a customer at customer premise 12, which may be blocked by geographic features such as river 14 from traditional wiring, to access network 16. In particular, although embodiments of the present invention are suitable for many applications, a particular problem solved with the present invention is applicable to a customer close to a river with heavy traffic of large boats. That is, the large boats, in a prior art system with a single link, may become large obstructions blocking the line of sight link for extended periods of time (that is, several minutes or more). In this particular situation, the customer premise buildings and surroundings are lower than the maximum height of boats navigating river 14. As such, it may be difficult to build a high tower at the customer premise, in which case embodiments of the present invention are suitable solutions that overcome the problem of a large obstruction blocking a single line of sight link. Particularly, wireless solutions are appropriate in these types of situations because of the costs and delay associated with traditional fiber or copper wiring when geographic surroundings make such construction difficult.

In the embodiment shown in FIG. 1, customer premise equipment 18 includes a first directional antenna 20 and a second directional antenna 22. As shown, access to network 16 is brought to customer premise 12 through first and second hubs 24 and 26, respectively. Hub 24 is connected to network 16 by link 28, while hub 26 is connected to network 16 by link 30. First directional antenna 20 is operative to communicate in a first line of sight 32. Second directional antenna 22 is operative to communicate in a second line of sight 34. As mentioned above, antennas 20 and 22 are highly directional in nature due to the high frequencies involved; however, it is preferred that hubs 24 and 26 broadcast information in a non-directional manner. Of course, it is to be appreciated by those skilled in the art that, as will be described later, different implementations of the present invention may employ repeaters as necessary in addition to hubs connected to network 16.

First antenna 20 and second antenna 22 are connected to local equipment 18 by lines 40 and 42. Lines 40 and 42 may take a variety of forms, and appropriate types of lines may be selected based on the distance between the antenna and the local customer premise equipment 18.

In accordance with the present invention, one antenna and hub pair forms the primary communication path along one corresponding antenna line of sight, while the other antenna and hub pair forms the redundant communication path along that corresponding line of sight. Advantageously, embodiments of the present invention create a redundant link so that there are two different paths of which both are not simultaneously obstructed.

In the embodiment shown in FIG. 1, it is preferred that network control logic 36 be configured to select one of the communication paths based on a status of the first and second lines of sight. That is, because antennas 20 and 22 are located within close proximity of each other, it is preferred that only one of the hubs broadcast signals to customer premise 12 at any given instant in time. As such, control logic 36 permits transmission by hub 24 when communication path 32 is selected, possibly because communication path 34 is obstructed. Further, control logic 36 permits hub 26 to transmit when path 34 is selected, possibly because path 32 is obstructed.

Figure 2:
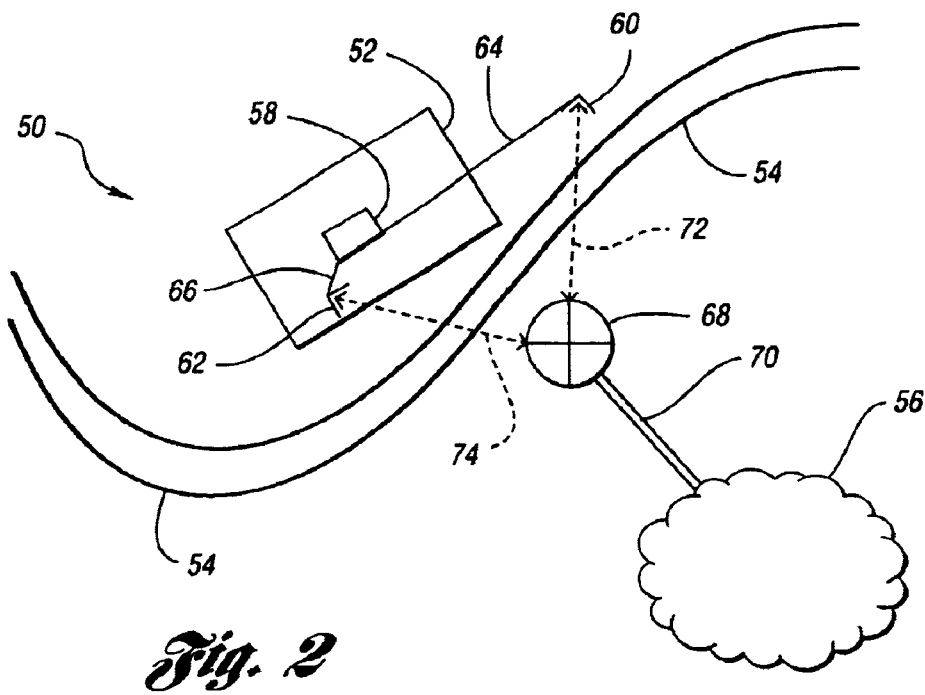
FIG. 2 is a broadband communication system of the present invention utilizing primary and redundant communication paths at a sufficiently high frequency to require line of sight, with control logic implemented at the customer premise.

In the embodiment shown in FIG. 2, another system of the present invention is generally indicated at 50. Customer premise 52 is separated by river 54 from network 56. Local customer premise equipment 58 connects to first and second directional antennas 60 and 62. Antennas 60 and 62 are connected to local equipment 58 by lines 64 and 66. In this embodiment, the first and second antennas and lines of sight are arranged with the antennas sufficiently spaced apart to separate the primary and redundant communication paths. This allows a single hub 68 to continuously broadcast signals which are received by both antennas 60 and 62. Hub 68 connects to network 56 by link 70. Antenna 60 may communicate with hub 68 along line of sight 72, while antenna 62 may communicate with hub 68 along line of sight 74. As such, this embodiment of the present invention advantageously provides a plurality of wireless links (as shown, two links, of course, there is no limit to the number of redundant links). It may be possible to directly combine signals from the two antennas at customer premise local equipment 58. However, to avoid problems associated with signal delay caused by the different path lengths associated with the first and second antennas, it is preferred that digital signal processing is employed to select one of the antennas for receiving the entire incoming signal or sending outgoing signals as best shown in FIG. 3.

Figure 3:
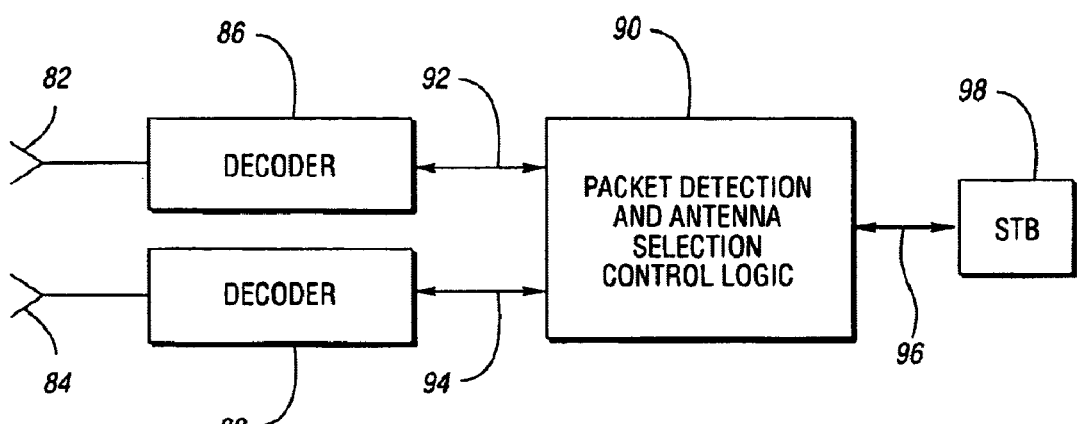
FIG. 3 is customer premise control logic for use with the embodiment of the present invention shown in FIG. 2.

With reference to FIG. 3, the first and second antennas are indicated at reference numbers 82 and 84, respectively. Each antenna connects to a decoder 86 and 88, respectively, which may appropriately be located at either the antenna or at the local customer premise equipment depending on the type of line connecting the antenna to the local equipment and the path length. Decoders 86 and 88 connect to customer premise control logic 90 as shown by links 92 and 94.

Customer premise control logic 90 performs packet detection and antenna selection. That is, because both antennas may be simultaneously receiving signals, the control logic selects the better signal and preferably has an output based solely on the selected signal as shown at 96. For example, if one of the communication paths is obstructed, for example, by a long term obstruction such as a boat passing through the antenna line of sight, control logic 90 selects the other signal (and as such selects the other path) for communications. In accordance with the present invention, the signal may carry various forms of voice and/or data and then connect to, for example, a set top box 98. Of course, the type of information being sent across the line of sight links may be any type whatsoever and the advantages of the present invention lie in the fact that redundant links may be used to overcome large term obstructions.

Figure 4:
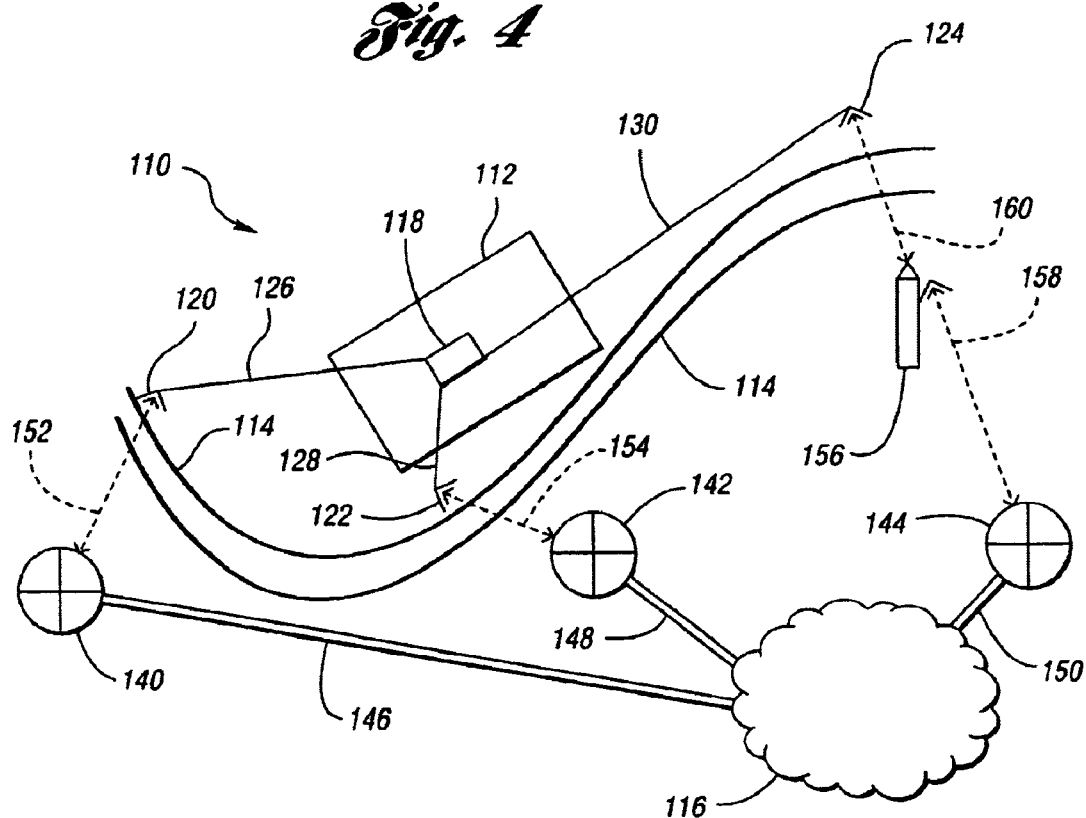
FIG. 4 is a broadband communication system of the present invention utilizing a plurality of antennas and transmitters to form a plurality of redundant communication paths along a plurality of lines of sight, showing some alternatives such as the use of a repeater, and the use of different connections for different distances between an antenna and the customer premise local equipment.

Referring to FIG. 4, another system of the present invention is generally indicated at 110. System 110 operates in a manner substantially similar to systems 10 and 50 of FIGS. 1 and 2 respectively, but further illustrates some alternatives that may be employed during implementation of the system. In FIG. 4, customer premise 112, blocked by geographic features such as river 114, connects to network 116. Local customer premise equipment 118 connects to a plurality of antennas. As shown, first, second and third directional antennas 120, 122, 124, respectively, connect to local customer premise equipment 118, by lines 126, 128, 130, respectively. As mentioned previously, antennas may connect to the local customer premise equipment 118 by a number of different connections to allow spacing of the antenna from the customer premise and possibly the placing of the antenna on an other nearby building. For example, line 128 may be a coaxial cable allowing the decoder to be located at local equipment 118. As appropriate for coaxial cable connections, antenna 122 preferably connects to coaxial cable 128 through a converter that down mixes the signal to an intermediate frequency. For example, the line of sight communications may take place at about 28 gigahertz, while the intermediate frequency may be about 2 gigahertz. Of course, other frequencies may be appropriate as appreciated by one of ordinary skill in the art based on a number of factors including length of cable 128.

Further, if it is desired that the antenna be placed further from the local customer premise equipment, such as antenna 120, twisted pair may be an appropriate form for the connection. As shown, line 126 may be a twisted pair. As such, it is appropriate to place a decoder at antenna 120 and to place appropriate communication equipment at 120 and at 118 such as digital modems so that the baseband signal is sent along link 126. Still further, if it is desired that the antenna be placed beyond the reach of twisted pair or if capacity needs demand it, such as antenna 124, then fiber may be appropriate. For example, line 130 may be a fiber wherein the high frequency signal may be sent along the fiber with limited processing necessary and most processing and decoding may occur at local customer premise equipment 118.

As shown in FIG. 4, hubs 140, 142, and 144 are connected to network 116 by links 146, 148, 150, respectively. Hub 140 communicates with antenna 120 along a line of sight communication path 152. Hub 142 communicates with antenna 122 along a different line of sight communication path 154.

In another alternative technique employed in carrying out some embodiments of the present invention, a repeater 156 communicates with hub 144 as indicated by arrow 158 (not necessarily line of sight). In turn, repeater 156 communicates with antenna 124 along line of sight communication path 160. That is, the term transmitter as used herein, may mean either a hub or a repeater, as required.

With reference to FIG. 5, yet another embodiment of the present invention is generally indicated at 180. System 180 allows customer premise 182 to access network 186 on the other side of geographic feature (river) 184. Local customer premise equipment 188 connects to a directional antenna 190 operative to communicate in a line of sight. Further, local equipment 188 connects to antenna 192 which is operative at frequencies not requiring line of sight. Alternatively, a single antenna may be used at the customer premise so long as the antenna has sufficient range to receive line of sight as well as non-line of sight frequency signals. As shown in FIG. 5, network 186 connects to hub 194 by link 196. Hub 194 acts as a primary transmitter in communication with network 186 and is configured to selectively transmit to antenna 190 at a sufficiently high frequency to require line of sight. That is, the primary communication path is indicated at 216. A secondary transmitter 198 is connected to network 186 by link 200. Secondary transmitter 198, with the transmitting antenna indicated at 204, is configured to selectively transmit at a frequency sufficient to communicate absent line of sight with antenna 192 as indicated at double-headed arrow 218. That is, path 218 is a secondary communication path that is utilized when path 216 is blocked, for example, by a large obstruction such as a boat passing along river 184.

Network control logic 206 configured to select the primary communication path 216 when the line of sight is clear, and to select the secondary communication path 218 when the line of sight is blocked. The line of sight being the line of sight along communication path 216 as required because communication path 218 does not require a line of sight. Appropriate frequencies for secondary communications to path 218 may be, for example, anything below about 6 Megahertz.

Of course, it is to be appreciated that as shown, hub 194 and secondary transmitter 198 have individual links 196 and 200, respectively, to network 186. Of course, it is to be appreciated that in the alternative, a link 202 may be provided between hub 194 and secondary transmitter 198. As such, only one of links 196 and 200 may be required. Further, link 202 may take a variety of forms such as twisted pair, fiber, or coaxial cable, depending on the length of the link in addition to capacity and cost considerations, or may be a wireless link (line of sight or non-line of sight).

Referring to FIG. 6, a method of the present invention is generally indicated at 220. At block 222, the primary communication path between the first directional antenna and a first transmitter along a first line of sight is established. The first transmitter may be a hub or may be a repeater in communication with the network through a hub. The first transmitter is configured to transmit at a sufficiently high frequency to require a line of sight. At block 224, a redundant communication path between a second directional antenna and a second transmitter along a second line of sight is established. The second transmitter may of course be a hub or may be a repeater in communication with the network through a hub. The second transmitter is configured to transmit at a sufficiently high frequency to require line of sight communications.

At block 226, one of the primary and redundant communication paths is selected based on a status of the first and second lines of sight. That is, the redundant communication paths provided by this embodiment of the present invention allows one of the paths to be blocked by a large obstruction, while communications may be adequately provided along the second path. Alternatively, any number of line of sight paths may be provided. Further, with customer premise antennas in close proximity of each other, a separate transmitter may be required for each antenna along with appropriate network control logic. On the other hand, sufficiently spaced antennas may communicate with a single transmitter.

In an alternative method of the present invention, shown in FIG. 7, and generally indicated at 230, a primary and secondary communication path (at different frequencies) are established. At block 232, a primary communications path that requires line of sight between a first directional antenna and a first transmitter is provided. The transmitter is configured to transmit a sufficiently high frequency to require line of sight. At block 234, a secondary communication path between a second directional antenna and a second transmitter is provided. The second transmitter is configured to transmit at a frequency sufficient to communicate absent line of sight.

At block 236, the primary communication path is selected when the line of sight is clear, and the secondary communication path is selected when the line of sight is blocked. Such selection may be made, for instance, by monitoring bit error rate on both paths and choosing the best one. Of course, when appropriate range is provided for a single antenna, separate antennas need not be provided.

It is to be appreciated that embodiments of the present invention are appropriate for other applications in addition to LMDS. For example, infrared laser (that is, other line of sight) applications are within the scope and spirit of the invention. Further, information sent over the line of sight links may take many forms such as ATM, modified ATM, Internet Protocol (IP), or other packet types.

While the best mode for carrying out the invention has been described in detail, those familiar with the art to which this invention relates will recognize various alternative designs and embodiments for practicing the invention defined by the following claims.

What is claimed is:

1. A system for broadband communication between a network and a customer premise along a line of sight path, the system comprising:
    a customer premise equipment having a first directional antenna operative to communicate in a first line of sight, and having a second directional antenna operative to communicate in a second line of sight that is different than the first line of sight;
    at least one transmitter in communication with the network and configured to transmit at a sufficiently high frequency to require line of sight, wherein the at least one transmitter, the first antenna, and the second antenna are located so as to form a primary communication path along the first line of sight and to form a redundant communication path along the second line of sight;
    wherein the at least one transmitter further comprises:
        a first transmitter located within the first line of sight and selectively operative to communicate with the first antenna along the primary communication path;
        a second transmitter located within the second line of sight and selectively operative to communicate with the second antenna along the redundant communication path; and
        network control logic configured to select one of the primary and redundant communication paths based a status of the first and second lines of sight so as to permit transmission by the first transmitter when the primary path is selected and to permit transmission by the second transmitter when the redundant path is selected.

2. The system of claim 1 wherein the at least one transmitter includes a hub connected to the network.

3. The system of claim 1 wherein the at least one transmitter includes a repeater operative to communicate with a hub connected to the network.

4. The system of claim 1 wherein the customer premise equipment further includes a decoder configured to decode communications received at the first and second antennas.

5. The system of claim 4 wherein the customer premise equipment further includes a coaxial cable connecting at least one antenna of the first and second antennas to the decoder, and wherein the at least one antenna connects to the coaxial cable through a converter to down convert communications to an intermediate frequency.

6. The system of claim 4 wherein the customer premise equipment further includes a fiber connecting at least one antenna of the first and second antennas to the decoder.

7. The system of claim 4 wherein the customer premise equipment further includes a twisted pair connected to the decoder.

8. The system of claim 1 wherein the sufficiently high frequency is within Local Multipoint Distribution System (LMDS) frequencies.

9. The system of claim 1 wherein the sufficiently high frequency is within infrared frequencies.

10. The system of claim 1 wherein the sufficiently high frequency is greater than about 12 Gigahertz.

11. A system for broadband communication between a network and a customer premise along a line of sight path, the system comprising:
    a customer premise equipment having a first directional antenna operative to communicate in a first line of sight, and having a second directional antenna operative to communicate in a second line of sight that is different than the first line of sight;
    at least one transmitter in communication with the network and configured to transmit at a sufficiently high frequency to require line of sight, wherein the at least one transmitter, the first antenna, and the second antenna are located so as to form a primary communication path along the first line of sight and to form a redundant communication path along the second line of sight;
    wherein the at least one transmitter is a single transmitter within the first line of sight and within the second line of sight, and wherein the first and second antennas are sufficiently spaced apart to separate the primary and redundant communication paths; and
    customer premise control logic configured to select one of the primary and redundant communication paths based on signal quality at the first and second antennas due to a status of the first and second lines of sight.

12. A system for broadband communication between a network and a customer premise along a line of sight path, the system comprising:
    a customer premise equipment having a directional antenna operative to communicate in a line of sight;
    a primary transmitter in communication with the network and configured to selectively transmit at a sufficiently high frequency to require line of sight, wherein the primary transmitter and the antenna are located so as to form a primary communication path along the line of sight;
    a secondary transmitter in communication with the network and configured to selectively transmit at a frequency sufficient to communicate absent line of sight, wherein the secondary transmitter and the antenna are located so as to form a secondary communication path; and
    network control logic configured to select the primary communication path when the line of sight is clear, and to select the secondary communication path when the line of sight is blocked.

\* \* \* \* \*